(12) United States Patent
Xu

(10) Patent No.: US 9,274,630 B2
(45) Date of Patent: Mar. 1, 2016

(54) IN-CELL TOUCH LIQUID CRYSTAL DISPLAY DEVICE

(71) Applicant: SHENZHEN CHINA STAR OPTOELECTRONICS TECHNOLOGY CO., LTD., Shenzhen, Guangdong (CN)

(72) Inventor: Xiangyang Xu, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 14/240,384

(22) PCT Filed: Jan. 23, 2014

(86) PCT No.: PCT/CN2014/071269
§ 371 (c)(1),
(2) Date: Jul. 31, 2014

(87) PCT Pub. No.: WO2015/100826
PCT Pub. Date: Jul. 9, 2015

(65) Prior Publication Data
US 2015/0185525 A1    Jul. 2, 2015

(30) Foreign Application Priority Data
Dec. 31, 2013  (CN) .......................... 2013 1 0752474

(51) Int. Cl.
*G02F 1/136*  (2006.01)
*G06F 3/041*  (2006.01)

(52) U.S. Cl.
CPC ..................................... *G06F 3/041* (2013.01)

(58) Field of Classification Search
CPC .......... G02F 1/13338; G02F 1/136286; G02F 1/1368; G06F 3/041
See application file for complete search history.

(56) References Cited

U.S. PATENT DOCUMENTS 8,421,978 B2 * 4/2013 Wang et al. .................... 349/147
2011/0102698 A1   5/2011 Wang et al. ...................... 349/54

FOREIGN PATENT DOCUMENTS

CN   102109691 A   6/2011
CN   102338948 A   2/2012

(Continued)

OTHER PUBLICATIONS

International Search Report mailed Sep. 28, 2014, issued to International Application No. PCT/CN2014/071269.

(Continued)

*Primary Examiner* — James Dudek
(74) *Attorney, Agent, or Firm* — Stein IP, LLC

(57) ABSTRACT

The present disclosure relates to the technical field of liquid crystal display, and particularly, relates to a built-in touch liquid crystal display device. The device is further provided with a touch sensing line, and at least in a part of the pixel units, a touch capacitor and a touch switch located between the touch capacitor and the touch sensing line and capable of connecting or disconnecting the both are arranged in correspondence to at least one pixel subunit, and wherein the voltage difference of the touch capacitor can be transferred to the touch sensing line. According to the present disclosure, the existing pressing capacitive built-in touch device is improved. In this way, the defects of this type of device existing before can be overcome. With the pixel aperture ratio improved, the pressing capacitive built-in touch technology can be applied to large-sized panels, and the touch driving circuit is simplified.

16 Claims, 5 Drawing Sheets

(56) References Cited

FOREIGN PATENT DOCUMENTS

| | | |
|---|---|---|
| CN | 102955311 A | 3/2013 |
| CN | 103699283 A | 4/2014 |
| CN | 203616736 U | 5/2014 |

OTHER PUBLICATIONS

Chinese Office Action dated Oct. 29, 2015, issued to Chinese Application No. 201310752474.7.

* cited by examiner

IN-CELL TOUCH LIQUID CRYSTAL DISPLAY DEVICE

FIELD OF THE INVENTION

The present disclosure relates to the technical field of liquid crystal display, and particularly, relates to a built-in touch liquid crystal display device.

BACKGROUND OF THE INVENTION

The development of touch technology generally aims at low cost, high yield, large size and high reliability etc. To fulfill these objectives, an ITO Sensor and a Cover lens may be integrated together, even with a thin-film transistor (TFT), on terms of process and technology, in order to reduce the production cost, lower the thickness of products, and eliminate defects on bonding.

With regard to materials used in touch technology, organic or inorganic substituting materials of ITO and flexible film and substrate may be developed, or relatively expensive toughened glass boards or polymethyl methacrylate (PMMA) plastic boards can be replaced with new plastic materials for the Cover lens. With regard to structures, built-in touch structures, such as On-Cell touch, In-Cell touch and the like, have been developed. The In-Cell touch structure is highly integrated, which leads to a low yield. However, a touch device with the In-Cell touch structure is in general thin in thickness and light in weight.

FIG. 1, FIG. 2 and FIG. 3 respectively show three types of common In-Cell touch technologies, including photosensitive touch technology, capacitive touch technology and resistive touch technology.

FIG. 1 shows the photosensitive touch technology, which can be embodied with multiple specific methods, wherein a typical one is that a relatively high current is formed in a photosensitive switch on a first substrate 1 under the irradiation of a laser pen, and the touch position can be determined by determining the position of the switch in which the current is generated.

FIG. 2 shows the capacitive touch technology. Namely, after a second substrate 2 is pressed, the thickness of a liquid crystal layer at the pressed position is changed, as a result of which the corresponding liquid crystal capacitance value is also changed, and the touch position can be determined by determining the position where the liquid crystal capacitance changes.

FIG. 3 shows the resistive touch technology. Namely, after the second substrate 2 is pressed, a conductive layer of the second substrate 2 is respectively in contact with a conductive pad connected with a transverse sensing line and a conductive pad connected with a longitudinal sensing line on the first substrate 1, and the touch position can be determined by determining the positions on the transverse sensing line and the longitudinal sensing line where the short circuit(s) occur(s).

However, it is difficult for the In-Cell touch technology in the prior art to be applied on a large-sized panel due to low pixel aperture ratio, and complicated touch driving circuit.

SUMMARY OF THE INVENTION

Aiming at the defects that it is very difficult for the In-Cell touch technology in the prior art to be applied to a large-sized panel due to low pixel aperture ratio, complicated touch driving circuit, and the like, the pressing capacitive built-in touch device in the prior art is improved according to the present disclosure.

The present disclosure proposes a built-in touch liquid crystal display device. The device includes an array substrate, a color filter substrate opposite to the array substrate, and a liquid crystal layer located between the array substrate and the color filter substrate, wherein first scan lines and data lines are arranged on the array substrate in a crisscross manner to define a plurality of pixel units, each pixel unit including at least three pixel subunits, each of which is provided with a first thin-film transistor and a pixel electrode, and the device is further provided with a touch sensing line, and at least in a part of the pixel units, a touch capacitor and a touch switch located between the touch capacitor and the touch sensing line and capable of connecting or disconnecting the both are arranged in correspondence to at least one pixel subunit, and wherein the voltage difference of the touch capacitor can be transferred to the touch sensing line.

According to the present disclosure, the existing pressing capacitive built-in touch device is improved. In this way, the defects of this type of device existing before can be overcome. With the pixel aperture ratio improved, the pressing capacitive built-in touch technology can be applied to large-sized panels, and the touch driving circuit is simplified.

Preferably, the touch capacitor includes a conductive pad in the respective pixel subunit on the array substrate, and a conductive element at a position on the color filter substrate opposite to the conductive pad.

Preferably, the conductive element is connected to a common line for supplying a reference voltage.

Preferably, the touch sensing line is connected to an amplifier capable of detecting a signal for the change of voltage difference.

A voltage difference is formed between the conductive pad and the conductive element, and is related to the capacitance of the touch capacitor. For the reason that the touch sensing line is connected to the amplifier capable of detecting a signal for the change of voltage difference, the device according to the present disclosure can effectively and accurately detect the position where the voltage difference or the capacitance changes, thus completing a touch process.

Preferably, the touch switch further includes a second thin-film transistor, which includes a gate connected with the first scan line, a source connected with the touch sensing line and a drain connected with the conductive pad.

Preferably, the touch sensing line is parallel to the data lines, and/or the touch sensing line and the data lines are formed in the same layer. Parallel arrangement of the touch sensing line and the data lines is favorable for wiring arrangement of the array substrate, which saves the wiring space, and meanwhile, effectively reduces the intersections between wires and the probability of circuit faults at the intersections. The touch sensing line and the data lines are provided in the same layer, which results in simplified manufacturing process, saved manufacturing materials, and a reduced cost in large-scale production, and thus a significant progress is achieved relative to the prior art.

Preferably, the source of the second thin-film transistor is connected to an area on the touch sensing line in which the touch sensing line is crossed with the first scan line. In this way, blocking of light is reduced, with the open area enlarged and the aperture ratio increased. The display effect of the liquid crystal panel and the utilization ratio of light energy are both improved.

Preferably, the touch sensing line is parallel to the first scan lines, and/or the touch sensing line and the first scan lines are formed in the same layer. Parallel arrangement of the touch sensing line and the first scan lines is favorable for wiring arrangement of the array substrate, which saves the wiring space, and meanwhile, effectively reduces the intersections between wires to the greatest extent and the probability of circuit faults at the intersections. The touch sensing line and the first scan lines are provided in the same layer, which means that the manufacturing process is simplified, manufacturing materials can be saved, and meanwhile, the cost of large-scale production can thus be reduced, with a significant progress achieved over the prior art.

Preferably, the source of the second thin-film transistor is connected to one end of a connecting line, formed in the same layer as the data lines, and the other end of the connecting line is connected to the touch sensing line through a via hole.

Preferably, an active layer of the second thin-film transistor and an active layer of the first thin-film transistor are formed in the same layer. Thus, the manufacturing process can be simplified, manufacturing materials are saved, and meanwhile, the cost of large-scale production can be reduced, with a significant progress achieve over the prior art.

Preferably, viewed from the normal direction of the liquid crystal panel, the positions of the second thin-film transistor, the conductive pad and the conductive element are at least partially superposed with the position of the first scan line. In such a manner, blocking of light is reduced, the open area is enlarged and the aperture ratio is improved. The display effect of the liquid crystal panel is thus improved.

Since the reference voltage would be transferred into the touch sensing line through the touch capacitor and the touch switch, the electric leakage may cause the voltage difference between two ends of the touch capacitor to be zero over time, which means that the touch may become invalid. To avoid the above-mentioned problems, preferably, the device further includes a second scan line, which is parallel to the first scan lines and formed in the same layer as the first scan lines, with the second scan line connected to the gate of a third thin-film transistor and the source of the third thin-film transistor connected to the touch sensing line for the release of charges.

According to the present disclosure, the existing pressing capacitive in-cell touch device is improved, so that the defects of this type of device existing before can be overcome. With the pixel aperture ratio improved, the pressing capacitive built-in touch technology may be applied to the large-sized panel, and the touch driving circuit is simplified.

The above-mentioned technical features may be combined in various appropriate manners or substituted by equivalent technical features, as long as the objective of the present disclosure can be fulfilled.

BRIEF DESCRIPTION OF THE DRAWINGS

The present disclosure will be described in more detail below based on merely nonfinite examples with reference to the accompanying drawings. Wherein.

Figure 1:
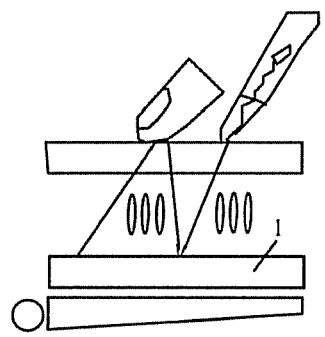
FIG. 1 shows a photosensitive touch technology in the prior art.
Figure 2:
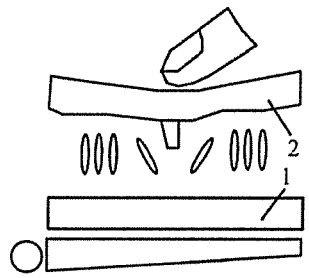
FIG. 2 shows a capacitive touch technology in the prior art.
Figure 3:
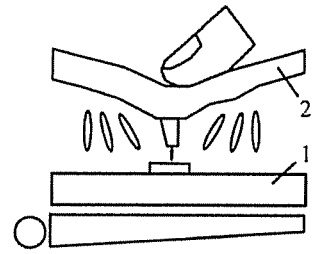
FIG. 3 shows a resistive touch technology in the prior art.

In the drawings, the same components are indicated by the same reference signs. The accompanying drawings are not drawn to actual scale.

DETAILED DESCRIPTION OF THE EMBODIMENTS

The present disclosure will be introduced in detail below with reference to the accompanying drawings.

Figure 5:
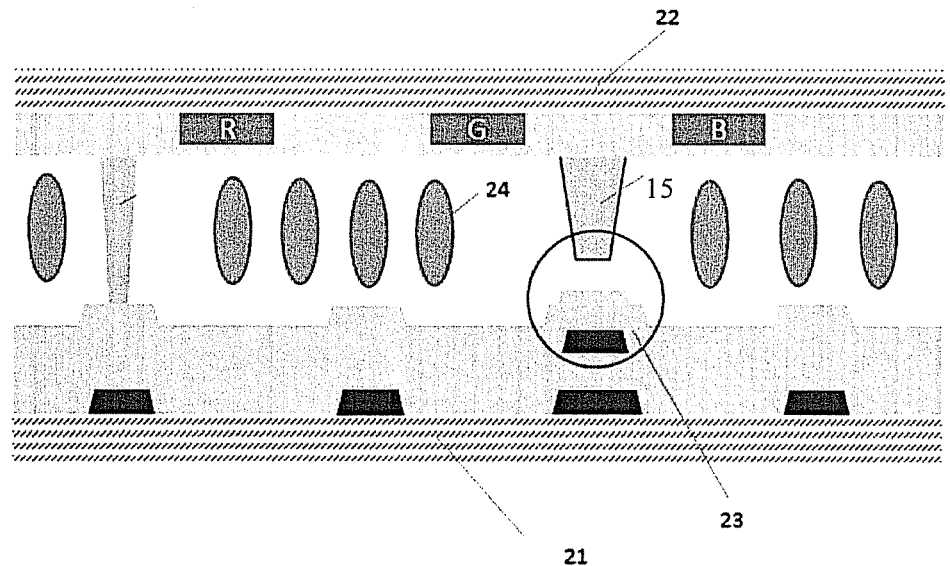
FIG. 5 shows a cross-sectional view of the built-in touch liquid crystal display device according to the present disclosure along the normal direction of a panel.

Firstly, reference is made to FIG. 5. FIG. 5 shows a cross-sectional view of a built-in touch liquid crystal display device according to the present disclosure along the normal direction of a panel. It could be seen from FIG. 5 that the built-in touch liquid crystal display device according to the present disclosure includes an array substrate 22, a color filter substrate 21 opposite to the array substrate 22, and a liquid crystal layer 24 located between the array substrate 22 and the color filter substrate 21.

Figure 4:
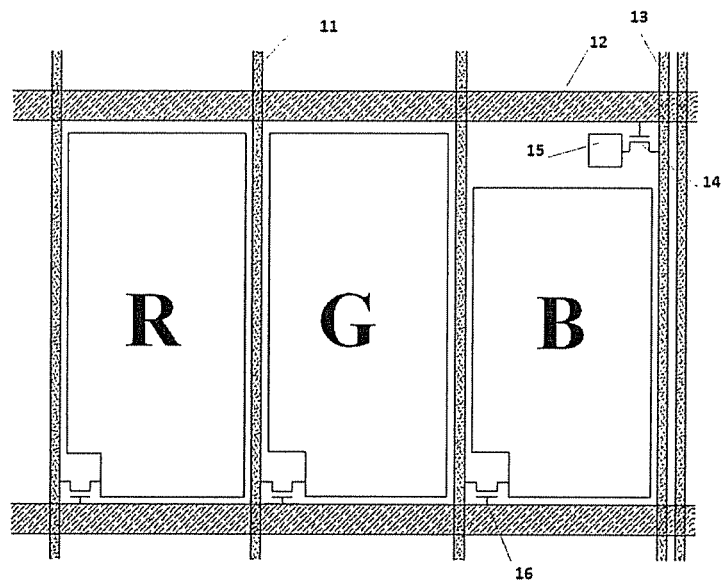
FIG. 4 shows a structural schematic diagram of a built-in touch liquid crystal display device according to the present disclosure.

FIG. 4 shows a structural schematic diagram of the built-in touch liquid crystal display device according to the present disclosure. With reference to FIG. 4, it could be further seen that first scan lines 12 and data lines 11 are arranged on the array substrate 22 in a crisscross manner, and thus define a plurality of pixel units. A pixel unit includes at least three pixel subunits (R, G and B), which respectively correspond to three primary colors of a liquid crystal display panel, namely, red, green and blue. Each pixel subunit is provided with a first thin-film transistor 16 and a pixel electrode.

A touch sensing line 13 is arranged in the liquid crystal display device according to the present disclosure. The touch sensing line 13 is connected to an amplifier capable of detecting a signal for the change of voltage difference.

Meanwhile, at least in a part of the pixel units, preferably in all the pixel units, a touch capacitor 23 (shown in detail in FIG. 5) and a touch switch 14 located between the touch capacitor 23 and the touch sensing line 13 and capable of connecting or disconnecting the both are arranged in correspondence to at least one pixel subunit. The voltage difference of the touch capacitor 23 can be transferred to the touch sensing line 13.

In the example shown in FIG. 4, the touch capacitor 23, the touch sensing line 13 and the touch switch 14 are all arranged in correspondence to the blue pixel subunit. However, this is nonfinite, and the touch capacitor 23 and the touch switch 14 may also be arranged in correspondence to the green pixel subunit or the red pixel subunit. Moreover, the numbers of the touch capacitors 23, the touch sensing lines 13 and the touch switches 14 corresponding to each liquid crystal pixel unit are not limited to one, and may be set as many according to the requirement for touch resolution.

With reference to FIG. 5 again, the touch capacitor 23 includes a conductive pad 15 in the corresponding pixel subunit of the array substrate 22, and a conductive element at a position of the color filter substrate 21 opposite to the conductive pad 15. The conductive element is connected to a common line for supplying a reference voltage.

Figure 6:
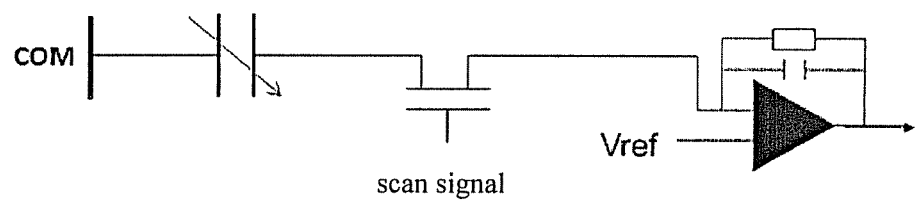
FIG. 6 shows a circuit diagram of the built-in touch liquid crystal display device according to the present disclosure.

FIG. 6 shows a circuit diagram of the built-in touch liquid crystal display device according to the present disclosure. With reference to FIG. 6, it could be seen that a voltage difference is formed between the conductive pad 15 and the conductive element, and is related to the capacitance of the touch capacitor 23. Since the touch sensing line 13 is connected to the amplifier capable of detecting a signal for the change of voltage difference, the device according to the present disclosure may effectively and accurately detect the position where the voltage difference or capacitance changes, thus completing a touch process.

Again with reference to FIG. 4, the touch switch 14 includes a second thin-film transistor, which includes a gate connected with the first scan line 12, a source connected with the touch sensing line 13, and a drain (indicated by sign 37 in FIG. 7) connected with the conductive pad 15.

Figure 7:
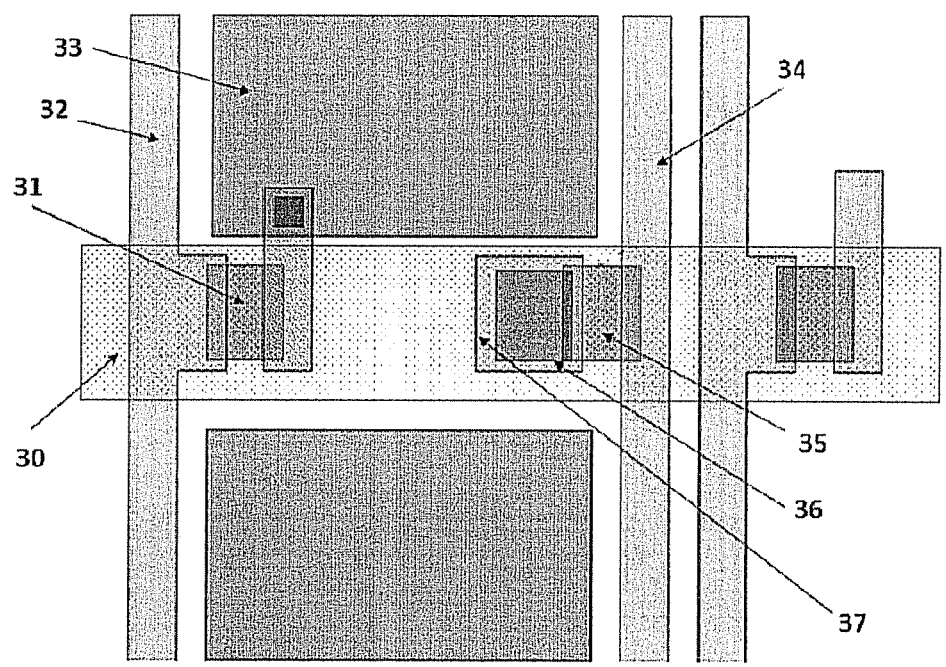
FIG. 7 shows a schematic diagram of a first example of the built-in touch liquid crystal display device according to the present disclosure.
Figure 8:
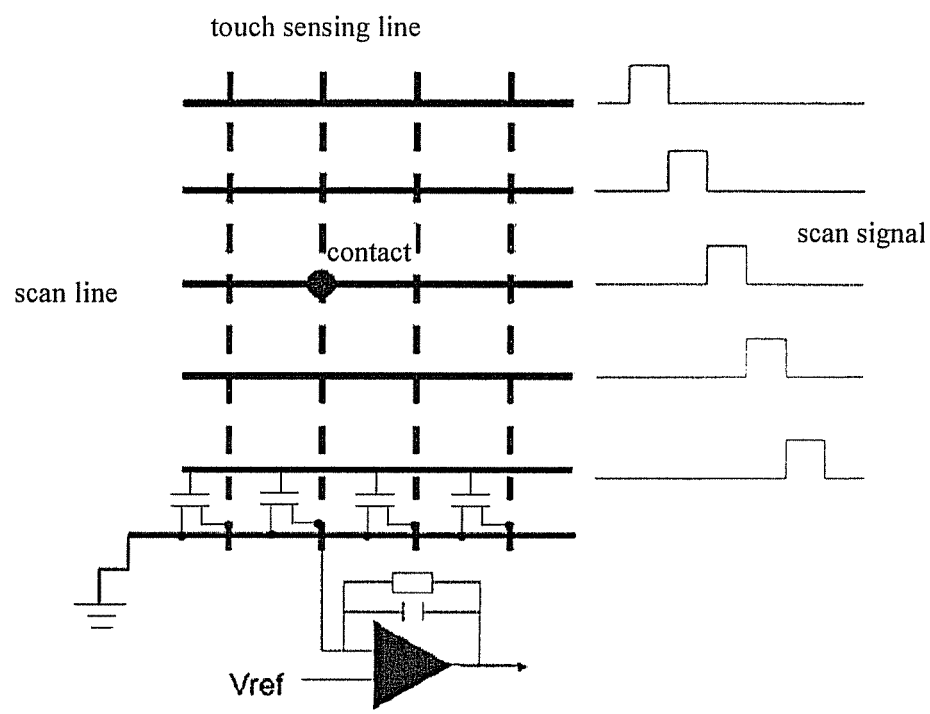
FIG. 8 shows a time sequence schematic diagram of scan signals of the first example according to the present disclosure.

FIG. 7 shows a schematic diagram of a first example of the built-in touch liquid crystal display device according to the present disclosure, and FIG. 8 shows a time sequence schematic diagram of scan signals of the first example according to the present disclosure.

In the first example, the touch sensing line 34 is parallel to the data lines 32. Preferably, the touch sensing line 34 and the data lines 32 are formed in the same layer. Parallel arrangement of the touch sensing line 34 and the data lines 32 is favorable for wiring arrangement of the array substrate, which saves the wiring space, reduces the intersections between wires to the greatest extent, and thus effectively reduces the probability of circuit faults at the intersections. The touch sensing line 34 and the data lines 32 are provided in the same layer, which means that the manufacturing process can be simplified, manufacturing materials can be saved, and meanwhile, the cost of large-scale production can be reduced, with a significant progress achieved over the prior art.

It could be seen from FIG. 7 that the source of the second thin-film transistor is connected to an area on the touch sensing line 34 in which the touch sensing line 34 is crossed with the first scan line 30. In this way, blocking of light is reduced, the open area is enlarged, and the aperture ratio is improved. The display effect of the liquid crystal panel and the utilization ratio of light energy are both improved.

Preferably, an active layer 35 of the second thin-film transistor and an active layer 31 of the first thin-film transistor are formed in the same layer. Thus, the manufacturing process can be simplified, manufacturing materials can be saved, and meanwhile, the cost of large-scale production can be reduced, resulting in a significant progress over the prior art.

With reference to FIG. 7, it could be seen that viewed from the normal direction of the liquid crystal panel, the positions 36 of the second thin-film transistor, the conductive pad and the conductive element are at least partially superposed with the position of the first scan line 30. In such a manner, blocking of light is reduced, the open area is enlarged and the aperture ratio is improved. The display effect of the liquid crystal panel is thus improved.

With reference to FIG. 8, if a touching motion is performed, the capacitance of the touch capacitor 23 would change accordingly, and the change of the voltage difference between the conductive element and the conductive pad 15 would be transferred to the touch sensing line through the touch switch 14, and then detected by the amplifier. In this way, a touch can be positioned.

Figure 9:
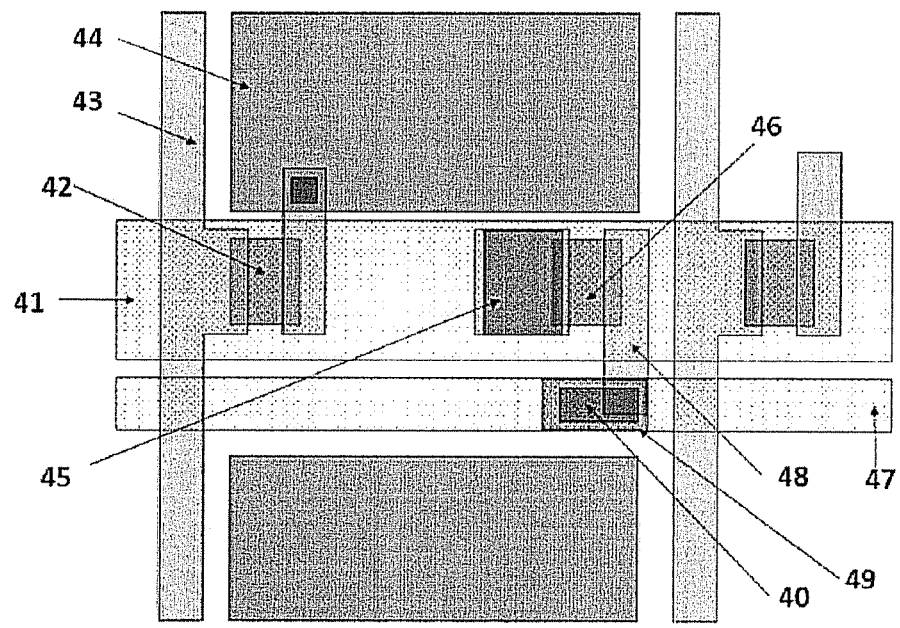
FIG. 9 shows a schematic diagram of a second example of the built-in touch liquid crystal display device according to the present disclosure.
Figure 10:
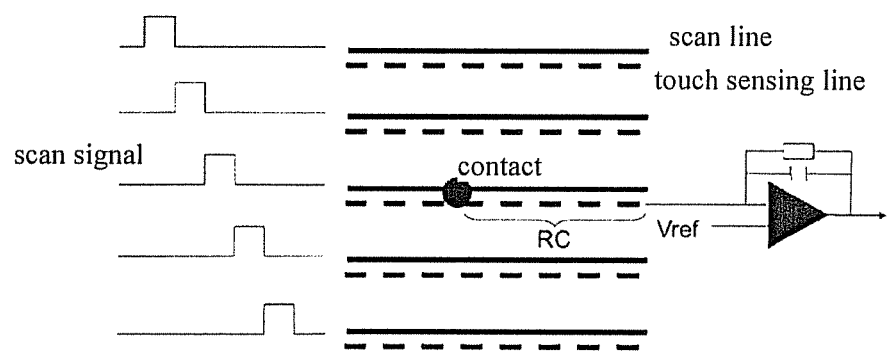
FIG. 10 shows a time sequence schematic diagram of scan signals of the second example according to the present disclosure.

FIG. 9 shows a schematic diagram of a second example of the built-in touch liquid crystal display device according to the present disclosure, and FIG. 10 shows a time sequence schematic diagram of scan signals of the second example according to the present disclosure.

In the second example, the touch sensing line 47 is parallel to the first scan lines 41. Preferably, the touch sensing line 47 and the first scan lines 41 are formed in the same layer. Parallel arrangement of the touch sensing line 47 and the first scan lines 41 is favorable for wiring arrangement of the array substrate, which saves the wiring space, reduces the intersections between wires to the greatest extent, and effectively reduces the probability of circuit faults at the intersections accordingly. The touch sensing line 47 and the first scan lines 41 are provided in the same layer, as a result of which the manufacturing process can be simplified, manufacturing materials can be saved, and meanwhile, the cost of large-scale production can be reduced. Therefore, a significant progress can be brought relative to the prior art.

Further, with reference to FIG. 9, the source of the second thin-film transistor is connected to one end of a connecting line 48, and the connecting line 48 is formed in the same layer as the data lines 43. Since a middle layer 49 exists between the connecting line 48 and the touch sensing line 47, the other end of the connecting line 48 is connected to the touch sensing line 47 through a via hole 40.

Preferably, an active layer 46 of the second thin-film transistor and an active layer 42 of the first thin-film transistor are formed in the same layer. Thus, the manufacturing process can be simplified, manufacturing materials can be saved, and meanwhile, the cost of large-scale production can be reduced, resulting in a significant progress over the prior art.

With reference to FIG. 9, it could be seen that viewed from the normal direction of the liquid crystal panel, the positions 45 of the second thin-film transistor, the conductive pad and the conductive element are at least partially superposed with the position of the first scan line 41. In such a manner, blocking of light is reduced, the open area is enlarged and the aperture ratio is improved. The display effect of the liquid crystal panel is thus improved.

With reference to FIG. 10, if a touching motion is performed, the capacitance of the touch capacitor 23 would be changed, and the change of the voltage difference between the conductive element and the conductive pad 15 is in turn transferred to the touch sensing line through the touch switch 14, and then detected by the amplifier. In this way, the touch can be positioned.

Since the reference voltage would be transferred to the touch sensing line 13 through the touch capacitor 23 and the touch switch 14, the electric leakage may lead the voltage difference between two ends of the touch capacitor 23 to be zero over time, which could render the touch invalid. To avoid the above-mentioned defect, in a preferred example, the device according to the present disclosure further includes a second scan line which is parallel to the first scan lines 12 and formed in the same layer as the first scan lines 12, with the second scan line connected to the gate of a third thin-film transistor, the source of which is then connected to the touch sensing line 13. Such a structure is configured to release charges, in order to keep the touch effective for long time, whereby the service life of the device can be prolonged, and the probability for a circuit to be damaged is thus reduced.

The conductive element may be made of polystyrene (PS).

According to the present disclosure, the existing pressing capacitive built-in touch device is improved, so that the defects of this type of device existing before are overcome, resulting in an improved pixel aperture ratio. Therefore, the pressing capacitive built-in touch technology may be applied to a large-sized panel, with the touch driving circuit simplified.

Although the present disclosure has been described with reference to the preferred examples, various modifications could be made to the present disclosure without departing from the scope of the present disclosure and components in the present disclosure could be substituted by equivalents. The present disclosure is not limited to the specific examples disclosed in the description, but includes all technical solutions falling into the scope of the claims.

The invention claimed is:

1. A built-in touch liquid crystal display device, including an array substrate, a color filter substrate opposite to the array substrate, and a liquid crystal layer located between the array substrate and the color filter substrate,
wherein first scan lines and data lines are arranged on the array substrate in a crisscross manner to define a plurality of pixel units, each pixel unit including at least three pixel subunits, each of which is provided with a first thin-film transistor and a pixel electrode, and
the device is further provided with a touch sensing line, and at least in a part of the pixel units, a touch capacitor and a touch switch located between the touch capacitor and the touch sensing line and capable of connecting or disconnecting the both are arranged in correspondence to at least one pixel subunit, and wherein the voltage difference of the touch capacitor can be transferred to the touch sensing line;
wherein the touch capacitor includes a conductive pad in the respective pixel subunit on the array substrate, and a conductive element at a position on the color filter substrate opposite to the conductive pad; and
the touch switch further includes a second thin-film transistor, which includes a gate connected with the first scan line, a source connected with the touch sensing line, and a drain connected with the conductive pad.

2. The device according to claim 1, wherein the conductive element is connected to a common line for supplying a reference voltage.

3. The device according to claim 1, wherein the touch sensing line is connected to an amplifier capable of detecting a signal for the change of voltage difference.

4. The device according to claim 2, wherein the touch switch further includes a second thin-film transistor, which includes a gate connected with the first scan line, a source connected with the touch sensing line and a drain connected with the conductive pad.

5. The device according to claim 3, wherein the touch switch further includes a second thin-film transistor, which includes a gate connected with the first scan line, a source connected with the touch sensing line and a drain connected with the conductive pad.

6. The device according to claim 1, wherein the touch sensing line is parallel to the data lines, and/or the touch sensing line and the data lines are formed in the same layer.

7. The device according to claim 6, wherein the source of the second thin-film transistor is connected to an area on the touch sensing line in which the touch sensing line is crossed with the first scan line.

8. The device according to claim 1, wherein the touch sensing line is parallel to the first scan lines, and/or the touch sensing line and the first scan lines are formed in the same layer.

9. The device according to claim 4, wherein the touch sensing line is parallel to the first scan lines, and/or the touch sensing line and the first scan lines are formed in the same layer.

10. The device according to claim 8, wherein the source of the second thin-film transistor is connected to one end of a connecting line formed in the same layer as the data lines, and the other end of the connecting line is connected to the touch sensing line through a via hole.

11. The device according to claim 1, wherein an active layer of the second thin-film transistor and an active layer of the first thin-film transistor are formed in the same layer.

12. The device according to claim 2, wherein viewed from the normal direction of the liquid crystal panel, the positions of the second thin-film transistor, the conductive pad and the conductive element are at least partially superposed with the position of the first scan line.

13. The device according to claim 3, wherein viewed from the normal direction of the liquid crystal panel, the positions of the second thin-film transistor, the conductive pad and the conductive element are at least partially superposed with the position of the first scan line.

14. The device according to claim 1, wherein the device further includes a second scan line, which is parallel to the first scan lines and formed in the same layer as the first scan lines, with the second scan line connected to the gate of a third thin-film transistor and the source of the third thin-film transistor connected to the touch sensing line for the release of charges.

15. The device according to claim 2, wherein the device further includes a second scan line, which is parallel to the first scan lines and formed in the same layer as the first scan lines, with the second scan line connected to the gate of a third thin-film transistor and the source of the third thin-film transistor connected to the touch sensing line for the release of charges.

16. The device according to claim 3, wherein the device further includes a second scan line, which is parallel to the first scan lines and formed in the same layer as the first scan lines, with the second scan line connected to the gate of a third thin-film transistor and the source of the third thin-film transistor connected to the touch sensing line for the release of charges.

* * * * *